US007562165B2

(12) United States Patent
Nagata

(10) Patent No.: US 7,562,165 B2
(45) Date of Patent: Jul. 14, 2009

(54) USB HOST SYSTEM, AV DATA REPRODUCTION APPARATUS AND AV DATA RECORDING APPARATUS

(75) Inventor: Tomomi Nagata, Osaka (JP)

(73) Assignee: Panasonic Corporation, Osaka (JP)

( * ) Notice: Subject to any disclaimer, the term of this patent is extended or adjusted under 35 U.S.C. 154(b) by 140 days.

(21) Appl. No.: 11/705,750

(22) Filed: Feb. 14, 2007

(65) Prior Publication Data
US 2007/0233908 A1    Oct. 4, 2007

(30) Foreign Application Priority Data

Feb. 14, 2006  (JP)  .............................. 2006-036318
Jan. 10, 2007  (JP)  .............................. 2007-002107

(51) Int. Cl.
*G06F 3/00* (2006.01)

(52) U.S. Cl. ............................. 710/21; 710/22; 710/53; 710/310

(58) Field of Classification Search ................... 710/20, 710/21, 53, 52, 56, 310, 22
See application file for complete search history.

(56) References Cited

U.S. PATENT DOCUMENTS

| | | | | |
|---|---|---|---|---|
| 5,774,744 | A * | 6/1998 | Story et al. | 710/27 |
| 5,845,151 | A * | 12/1998 | Story et al. | 710/27 |
| 6,421,770 | B1 * | 7/2002 | Huch et al. | 711/209 |
| 6,505,263 | B1 * | 1/2003 | Larson et al. | 710/100 |
| 6,535,935 | B1 * | 3/2003 | Carlson et al. | 710/58 |
| 6,823,403 | B2 | 11/2004 | Gulick et al. | |
| 7,035,948 | B1 * | 4/2006 | Liang et al. | 710/56 |
| 7,409,485 | B1 * | 8/2008 | Sartin | 710/305 |

FOREIGN PATENT DOCUMENTS

JP   2001-337913 A   12/2001

OTHER PUBLICATIONS

Compaq et al. Universal Serial Bus Specification. Revision 2.0. Apr. 27, 2000.*
Intel Corporation. Enhanced Host Controller Interface Specification for Universal Serial Bus. Revision 1.0. Mar. 12, 2002.*
Intel Corporation. Universal Host Controller Interface (UHCI) Design Guide. Revision 1.1. Mar. 1996.*
Podgorski et al. Implementation of the USB Interface in the Instrumentation for Sound and Vibration Measurements and Analysis. IEEE International Workshop on Intelligent Data Acquisition and Advanced Computing Systems: Technology and Applications. Sep. 2003.*

* cited by examiner

*Primary Examiner*—Mark Rinehart
*Assistant Examiner*—Matthew D Spittle
(74) *Attorney, Agent, or Firm*—McDermott Will & Emery LLP

(57) ABSTRACT

A USB host system includes a USB host controller including a transfer memory for USB data transfer. In the transfer memory, a plurality of transfer descriptor regions are allocated. Transfer descriptor setting means sets, for the USB host controller, a transfer descriptor for executing USB transfer. The transfer descriptor setting means can set, for one end point of a USB device, a plurality of transfer descriptors using the plurality of transfer descriptor regions, respectively.

12 Claims, 9 Drawing Sheets

USB HOST SYSTEM, AV DATA REPRODUCTION APPARATUS AND AV DATA RECORDING APPARATUS

CROSS-REFERENCE TO RELATED APPLICATION

The disclosure of Japanese Patent Applications No. 2006-36318 filed on Feb. 14, 2006, and No. 2007-2107 filed on Jan. 10, 2007, including specification, drawings and claims is incorporated herein by reference in its entirety.

BACKGROUND OF THE INVENTION

1. Field of the Invention

The present invention relates to a USB host system for performing data transfer with a USB device.

2. Description of the Related Art

The USB (Universal Serial Bus) standard is one of standards for external buses for connecting personal computer (PC) and its peripheral equipment. The USB standard is realized by mounting a USB host function on PC and a USB device function on peripheral equipment of the PC.

As methods for increasing transfer speed of data transfer between PC and its peripheral equipment, a method for improving transfer capability of a USB host and a method for improving transfer capability of a USB device have been known. However, it should be noted that a USB host is incorporated in a system including a high-speed CPU, i.e., PC and a large capacity memory. Therefore, the focus has not been on improving the operation speed of USB hosts but efforts have been made to increase the transfer speed of USB devices to be incorporated into a system including a less powerful CPU and a small memory (see, for example, Japanese Laid-Open Publication No. 2001-337913).

In recent years, however, incorporation of a USB host in an AV system such as an AV component system and a digital video recording apparatus, which is other than PC, started to be used. Compared to PC, the processing capability of a CPU in such an AV system is low and a memory provided in the AV system is small. Moreover, a USB host controller which is compliant with an OHCI (Open Host Controller Interface) standard performs data transfer with USB device equipment via a transfer memory exclusively used for USB data transfer. Specifically, in data transfer from an AV system to USB device equipment, data which is located on the AV system and is to be transferred has to be first transferred to the transfer memory. Moreover, in data transfer from the USB device equipment to the AV system, data which has been transferred from the USB device equipment is first stored in the transfer memory and thus data transfer from the transfer memory to a memory of the AV memory is required.

In general, a transfer memory is small in size. Therefore, data to be transferred is divided into small portions each having a corresponding size to the size of the transfer memory and then is transferred and internal data transfer processing between the transfer memory and a memory is performed for each data transfer, thereby realizing USB data transfer. In this case, while internal data transfer processing is performed, the transfer memory does not have an empty space and USB data transfer by the USB host controller can not be performed, so that data transfer with the USB device equipment is temporally stopped. Therefore, transfer speed reduced.

SUMMARY OF THE INVENTION

The present invention has been devised to solve the above-described problems, and therefore, it is an object of the present invention to provide a USB host system, an AV data reproduction apparatus and an AV data recording apparatus which can execute high-speed USB data transfer.

The present invention provides, as a USB host system for performing USB data transfer with a USB device connected to the USB host system, a system including: a USB host controller which is compliant with an OHCI standard and includes a transfer memory for USB data transfer; a memory; a data transfer processing block for performing internal data transfer between the memory and the transfer memory; and transfer descriptor setting means for setting, for the USB host controller, a transfer descriptor for executing USB data transfer. In the system, in the transfer memory, first through Nth (N is an integer of 2 or larger) transfer descriptor regions are allocated, and the transfer descriptor setting means is configured so as to be able to set, for one end point of the USB device, a plurality of transfer descriptors using the first through Nth transfer descriptor regions, respectively.

According to the present invention, a plurality of transfer descriptor regions are allocated in the transfer memory for USB data transfer, included in the host controller, so that a plurality of transfer descriptors using the plurality of transfer descriptor regions, respectively, can be set for one end point of the USB device. Thus, even while internal data transfer between the memory and the transfer memory is performed, USB data transfer with the USB device can be continuously executed according to a transfer descriptor using another transfer descriptor region in the transfer memory. Accordingly, USB data transfer between the USB device and the USB host system can be continuously executed without being stopped, so that transfer speed can be improved.

DESCRIPTION OF THE PREFERRED EMBODIMENTS

Hereafter, embodiments of the present invention will be described with reference to the accompanying drawings.

First Embodiment

Figure 1:
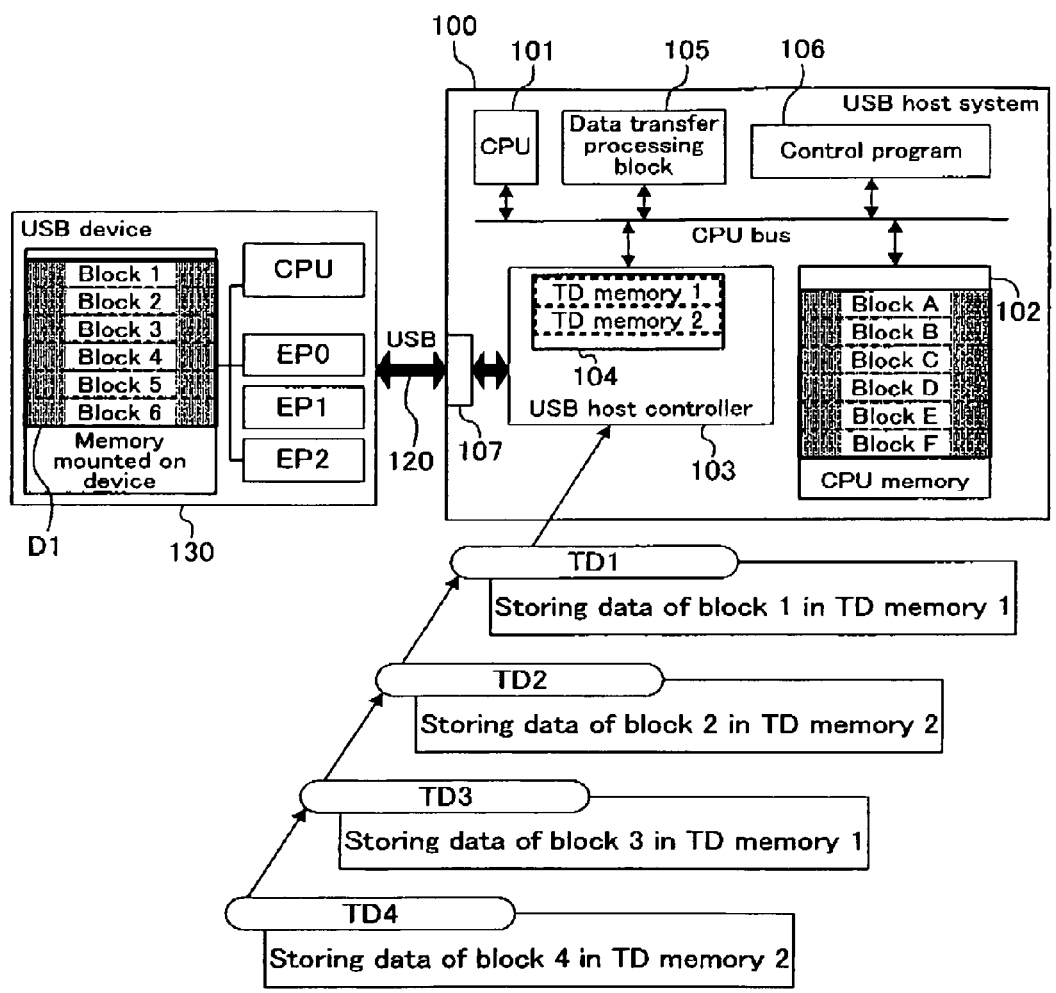
FIG. 1 is a block diagram of a USB host system according to a first embodiment of the present invention.

FIG. 1 is a block diagram of a USB (Universal Serial Bus) host system according to a first embodiment of the present invention. In FIG. 1, a USB host system 100 performs USB data transfer with a USB device 130 connected via a USB bus 120. The USB host system 100 includes a CPU 101, a CPU memory 102 as a memory, a USB host controller 103 which is compliant with the OHCI (Open Host Controller Interface) standard and includes a transfer memory 104 for USB data transfer, a data transfer processing block 105 for performing internal data transfer between the CPU memory 102 and the transfer memory 104, a storage section 106 for storing a control program for setting a transfer descriptor (TD) for the USB host controller 103, and a USB connection portion 107 for connecting the USB device 130 with the USB host system 100.

In this embodiment, the USB host system 100 reads out transfer source data D1 from the USB device 130 via the USB bus 120 and stores the transfer source data D1 in CPU memory 102 in the USB host system 100. A data amount of the transfer source data D1 is larger than a capacity of the transfer memory 104. For convenience of description, it is assumed that an end point 2 (EP 2) of end points in the USB device 130 is used for data transfer.

When data is transferred from the USB device 130 to the USB host system 100, first, data is transferred from the USB device 130 to the transfer memory 104 using the USB host controller 103 and then the data transfer processing block 105 transfers data from the transfer memory 104 to the CPU memory 102. To transfer data from the USB device 130 to the transfer memory 104, a transfer descriptor has to be set for the USB host controller 103.

Thus, for example, the CPU 101 executes the control program stored in the storage section 106, thereby setting transfer descriptors 1 through 4 (TD 1 through TD 4) shown in FIG. 1 for the USB host controller 103. That is, transfer descriptor setting means is realized by the CPU 101 and the control program. When a transfer descriptor is set, contents of the transfer descriptor are written in the transfer memory 104.

In this case, assume that a plurality of transfer descriptor regions are allocated in the transfer memory 104. Then, the transfer descriptor setting means is capable of setting, for one end point of a USB device, a plurality of transfer descriptors using the transfer descriptor regions, respectively. Thus, even while data is transferred from the transfer memory 104 to the CPU memory 102, data transfer from the USB device 130 to the transfer memory 104 becomes possible.

In this embodiment, it is assumed that two transfer descriptor regions are allocated in the transfer memory 104. Specifically, in the transfer memory 104, a TD memory 1 as a first transfer descriptor region and a TD memory 2 as a second transfer descriptor region are allocated. The TD memory 1 and the TD memory 2 may have the same size or different sizes. Moreover, the transfer memory 104 does not have to be divided into completely two parts, i.e., the TD memory 1 and the TD memory 2 but may be divided into three or more regions, i.e., the TD memory 1, the TD memory 2 and another region so that two transfer descriptor regions and another region are allocated.

Data transfer according to this embodiment will be described in the following manner.

First, for the USB host controller 103, "obtaining data of a block 1 from EP 2 in the USB device and storing data in the TD memory 1" is set as the transfer descriptor 1 (TD 1). The block 1 is part of the transfer source data D1 starting from the beginning of the transfer source data D1 and having a corresponding size to the TD memory 1. Subsequently, "obtaining data of a block 2 from EP 2 in the USB device and storing data in the TD memory 2" is set as the transfer descriptor 2 (TD 2). The block 2 is part of the transfer source data D1 starting next to the block 1 and having a corresponding size to the TD memory 2. The block 1 and the block 2 do not have to have the same sizes as the respective sizes of the TD memory 1 and the TD memory 2, respectively. There will be no problem as long as each block in a transfer destination has a size equal to or smaller than a size of a corresponding TD memory in a transfer destination.

After the above-described setting is done, transfer start-up is executed to the USB host controller 103. Then, the USB host controller 103 executes transfer in the order from the transfer descriptor 1 which has been set.

Specifically, according to the transfer descriptor 1, the USB host controller 103 reads out data of the block 1 from the USB device 130, transfers data to the TD memory 1 and stores data in the TD memory 1. When all the data of the block 1 is stored in the TD memory 1, the transfer according to the transfer descriptor 1 is completed. At this time, the USB host controller 103 notifies the CPU 101 of the completion of transfer. Then, the USB host controller 103 executes transfer according to the transfer descriptor 2 following the transfer descriptor 1.

Specifically, according to the transfer descriptor 2, the USB host controller 103 reads out data of the block 2 from the USB device 130, transfers data to the TD memory 2 and stores data in the TD memory 2. At this time, the CPU 101 which has been notified of the completion of transfer controls the data transfer processing block 105 according to the control program to execute data transfer from the TD memory 1 to the CPU memory 102. The data of the block 1 stored in the TD memory 1 is transferred to a block A which is a corresponding region in the CPU memory 102. That is, USB transfer (i.e., data transfer from the USB device 130 to the TD memory 2 in the transfer memory 104) using the USB host controller 103 according to the transfer descriptor 2 and internal data transfer processing (i.e., data transfer from the TD memory 1 in the transfer memory 104 to the CPU memory 102) by the data transfer processing block 105 are performed in parallel.

Moreover, "obtaining data of a block 3 from EP 2 in the USB device and storing data in the TD memory 1" is set as the transfer descriptor 3 (TD 3). The block 3 is part of the transfer source data D1 starting next to the block 2 and having a corresponding size to the TD memory 1. Note that the USB host system is preferably configured so that each of the internal data transfer processing by the data transfer processing block 105 and setting of the subsequent transfer descriptor 3 is completed before the USB transfer according to the transfer descriptor 2 is completed. To achieve this configuration, it is preferable that the data transfer processing block 105 is realized using a block such as a DMA controller, which is capable of high-speed transfer.

When all the data of the block 2 is stored in the TD memory 2, completion of the transfer descriptor 2 is notified from the USB host controller 103 to the CPU 101. Then, the USB host controller 103 executes transfer according to the transfer descriptor 3 following the transfer descriptor 2.

Specifically, according to the transfer descriptor 3, the USB host controller 103 reads out data of the block 3 from the USB device 130, transfers data to the TD memory 1 and stores data in the TD memory 1. At this time, the CPU 101 which has been notified of the completion of transfer controls the data transfer processing block 105 according to the control program to execute data transfer from the TD memory 2 to the CPU memory 102. The data of the block 2 stored in the TD memory 2 is transferred to a block B which is a corresponding region in the CPU memory 102. That is, USB transfer (i.e., data transfer from the USB device 130 to the TD memory 1 in the transfer memory 104) using the USB host controller 103 according to the transfer descriptor 3 and internal data transfer processing (i.e., data transfer from the TD memory 2 in the transfer memory 104 to the CPU memory 102) by the data transfer processing block 105 are performed in parallel.

Moreover, "obtaining data of a block 4 from EP 2 in the USB device and storing data in the TD memory 2" is set as a subsequent transfer descriptor (TD 4). The block 4 is part of the transfer source data D1 starting next to the block 3 and having a corresponding size to the TD memory 2. Also, in this case, the USB host system is preferably configured so that each of the internal data transfer processing by the data transfer processing block 105 and setting of the subsequent transfer descriptor 4 is completed before the USB transfer according to the transfer descriptor 3 is completed.

When all the data of the block 3 is stored in the TD memory 1, completion of the transfer descriptor 3 is notified from the USB host controller 103 to the CPU 101. Then, the USB host controller 103 executes transfer according to the transfer descriptor 4 following the transfer descriptor 3.

Specifically, according to the transfer descriptor 4, the USB host controller 103 reads out data of the block 4 from the USB device 130, transfers data to the TD memory 2 and stores data in the TD memory 2. At this time, the CPU 101 which has been notified of the completion of transfer controls the data transfer processing block 105 according to the control program to execute data transfer from the TD memory 1 to the CPU memory 102. The data of the block 3 stored in the TD memory 1 is transferred to a block C which is a corresponding region in the CPU memory 102. That is, USB transfer (i.e., data transfer from the USB device 130 to the TD memory 2 in the transfer memory 104) using the USB host controller 103 according to the transfer descriptor 4 and internal data transfer processing (i.e., data transfer from the TD memory 1 in the transfer memory 104 to the CPU memory 102) by the data transfer processing block 105 are performed in parallel.

Hereafter, the same operation is repeatedly executed until all the transfer source data D1 is transferred.

Figure 2A:
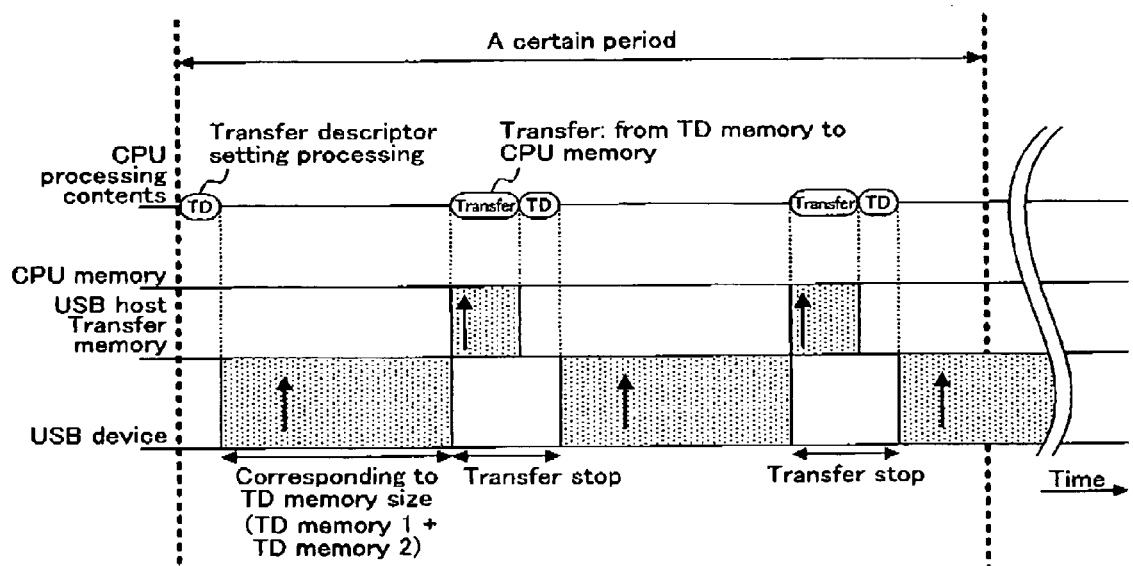
FIG. 2A is a view showing an exemplary data transfer operation in a known manner.
Figure 2B:
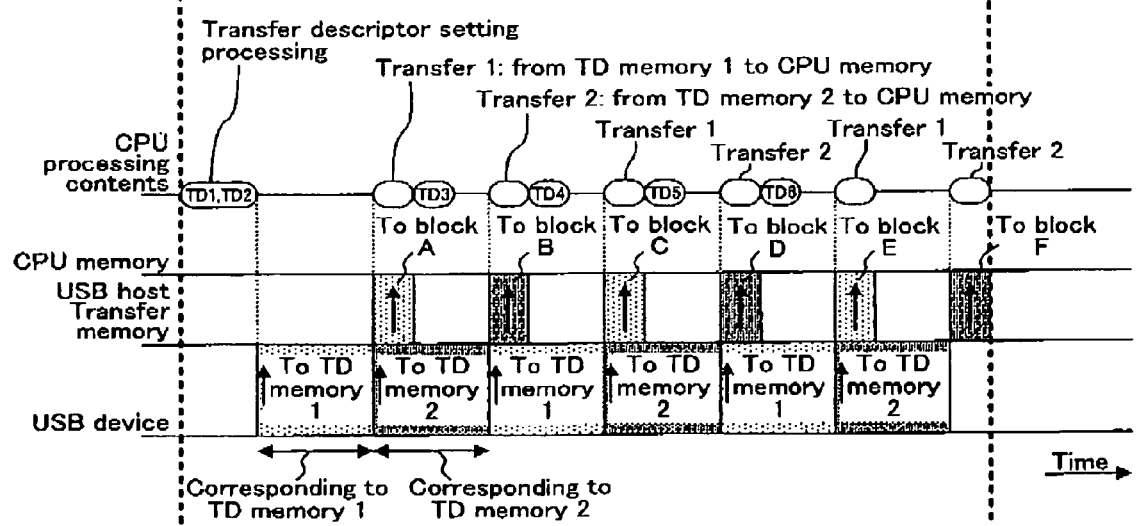
FIG. 2B is a view showing an exemplary data transfer operation of the USB host system of FIG. 1.

FIG. 2A is a view showing an exemplary operation when the known transfer method is used. FIG. 2B is a view showing an exemplary operation according to this embodiment. As shown in FIG. 2A, in the known transfer method, a period in which USB transfer from a USB device to a transfer memory in a USB host controller is stopped is generated. In contrast to this, as shown in FIG. 2B, in this embodiment, USB transfer is not stopped and data transfer is completed within a certain period which is shorter than that in the known transfer method.

That is, according to this embodiment, a plurality of transfer descriptors using different regions in a transfer memory are set, so that data transfer from the USB device according to a transfer descriptor and internal data transfer processing from the transfer memory to a CPU memory can be executed in parallel. Accordingly, USB transfer by the USB host controller can be continuously executed and thus transfer speed can be increased.

Second Embodiment

Figure 3:
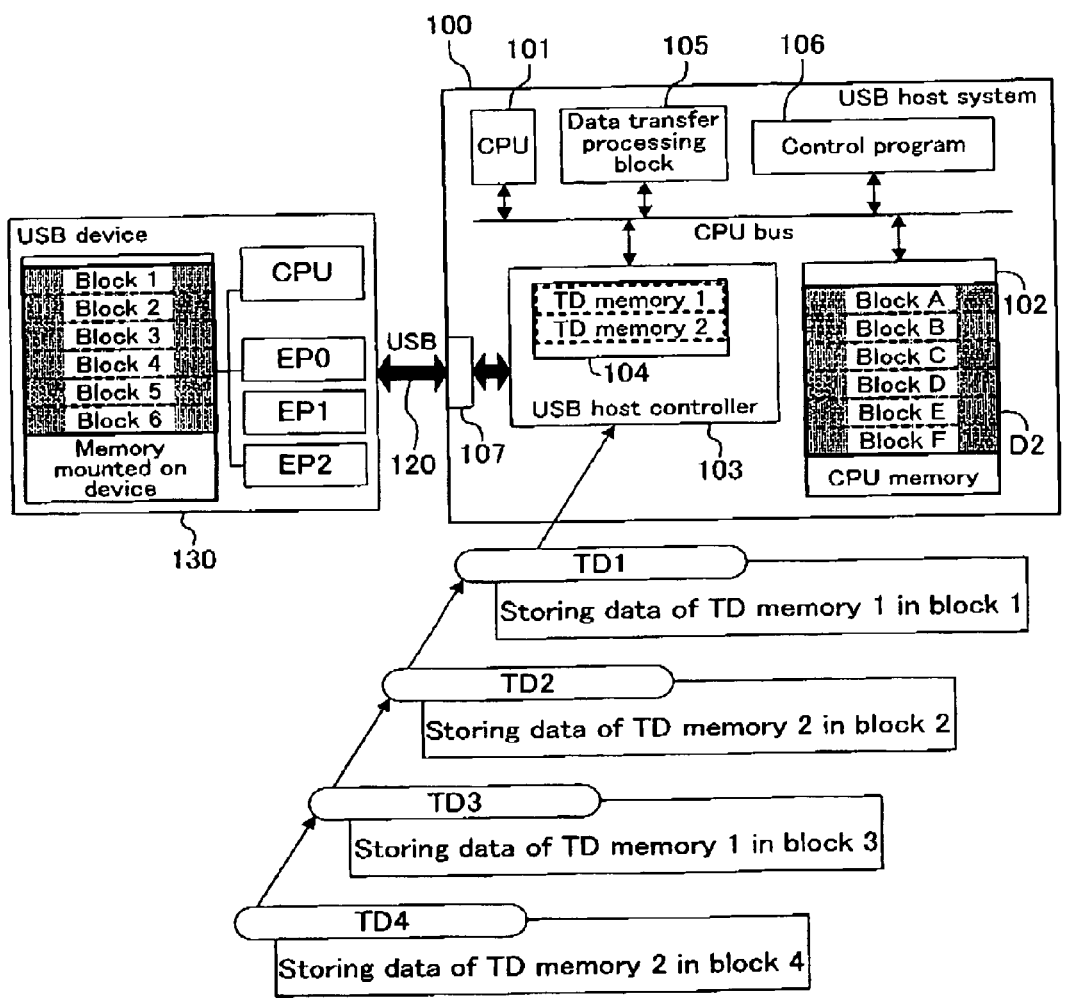
FIG. 3 is a block diagram illustrating a configuration of a USB host system according to a second embodiment of the present invention.

FIG. 3 is a block diagram illustrating a configuration of a USB host system according to a second embodiment of the present invention. The USB host system of the second embodiment has basically the same configuration as the configuration of the USB host system of the first embodiment. Therefore, in FIG. 3, each member also shown in FIG. 1 is identified by the same reference numeral and the detail description thereof will be omitted.

In this embodiment, transfer source data D2 stored in the CPU memory 102 in the USB host system 100 is transferred to the USB device 130. Assume that a data amount of the transfer source data D2 is larger than a capacity of the transfer memory 104. For convenience of description, it is assumed that the end point 2 (EP 2) of the end points in the USB device 130 is used for data transfer.

When data is transferred from the USB host system 100 to the USB device 130, first, the data transfer processing block 105 transfers data from the CPU memory 102 to the transfer memory 104 and then data is transferred from the transfer memory 104 to the USB device 130 using the USB host controller 103. To transfer data from the transfer memory 104 to the USB device 130, a transfer descriptor has to be set for the USB host controller 103.

Thus, for example, transfer descriptors 1 through 4 (TD 1 through TD 4) shown in FIG. 3 are set for the USB host controller 103 by executing the control program stored in the storage section 106. That is, transfer descriptor setting means is realized by the CPU 101 and the control program. When a transfer descriptor is set, contents of the transfer descriptor are written in the transfer memory 104.

In this case, assume that a plurality of transfer descriptor regions are allocated in the transfer memory 104. It is also assumed that the transfer descriptor setting means is capable of setting, for one end point of a USB device, a plurality of transfer descriptors using the transfer descriptor regions, respectively. Thus, even while data is transferred from the CPU memory 102 to the transfer memory 104, data transfer from the transfer memory 104 to the USB device 130 becomes possible.

In this embodiment, it is assumed that two transfer descriptor regions are allocated in the transfer memory 104. Specifically, in the transfer memory 104, a TD memory 1 as a first transfer descriptor region and a TD memory 2 as a second transfer descriptor region are allocated. The TD memory 1 and the TD memory 2 may have the same size or different sizes. Moreover, the transfer memory 104 does not have to be divided into completely two parts, i.e., the TD memory 1 and the TD memory 2 but may be divided into three or more regions, i.e., the TD memory 1, the TD memory 2 and another region so that two transfer descriptor regions and another region are allocated.

Data transfer according to this embodiment will be described in the following manner.

First, the data transfer processing block 105 transfers part of the transfer source data D2 from the CPU memory 102 to the transfer memory 104. Specifically, the block A, i.e., part of the transfer source data D2 starting from the beginning of the transfer source data D2 and having a corresponding size to the TD memory 1 is transferred to the TD memory 1 and the block B, i.e., part of the transfer source data D2 starting next to the block A and having a corresponding size to the TD memory 2 is transferred to the TD memory 2. The block 1 and the block 2 do not have to have the same sizes as the respective sizes of the TD memory 1 and the TD memory 2, respectively. There will be no problem as long as each block in a transfer destination has a size equal to or smaller than a size of a corresponding TD memory in a transfer destination.

After a series of transfer by the data transfer processing block 105 is completed, i.e., the data of the block A is transferred to the TD memory 1 and then the data of the block B is transferred to the TD memory 2, the transfer descriptor 1 (TD 1) and the transfer descriptor 2 (TD 2) are set for the USB host controller 103. Specifically, "storing data of the TD memory 1 in the block 1 via EP 2 in the USB device" as the transfer descriptor 1 and "storing data of the TD memory 2 in the block 2 via EP 2 in the USB device" as the transfer descriptor 2 are set.

After the above-described setting is done, transfer start-up is executed to the USB host controller 103. The USB host controller 103 executes transfer in the order from the transfer descriptor 1 which has been set.

Specifically, according to the transfer descriptor 1, the USB host controller 103 transfers data of the TD memory 1 to the USB device 130. When all the data of the TD memory 1 is stored in the USB device 130, the transfer according to the transfer descriptor 1 is completed. At this time, the USB host controller 103 notifies the CPU 101 of the completion of transfer. Then, the USB host controller 103 executes transfer according to the transfer descriptor 2 following the transfer descriptor 1.

Specifically, according to the transfer descriptor 2, the USB host controller 103 transfers the data of the TD memory 2 to the USB device 130. At this time, the CPU 101 which has been notified of the completion of transfer controls the data transfer processing block 105 according to the control program to execute data transfer from the CPU memory 102 to the TD memory 1. Data of the block C which is to be transferred next in the transfer source data D2 in the CPU memory 102 is transferred to the TD memory 1. That is, USB transfer (i.e., data transfer from the TD memory 2 in the transfer memory 104 to the USB device 130) using the USB host controller 103 according to the transfer descriptor 2 and internal data transfer processing (i.e., data transfer from the CPU memory 102 to the TD memory 1 in the transfer memory 104) by the data transfer processing block 105 are performed in parallel.

Moreover, "storing data of the TD memory 1 in the block 3 via EP 2 in the USB device" is set as the transfer descriptor 3 (TD 3). Note that the USB host system is preferably configured so that each of the internal data transfer processing by the data transfer processing block 105 and setting of the subsequent transfer descriptor 3 is completed before the USB transfer according to the transfer descriptor 2 is completed. To achieve this configuration, it is preferable that the data transfer processing block 105 is realized by a block such as a DMA controller, which is capable of high-speed transfer.

When all the data of the TD memory 2 is transferred to the USB device 130, the USB host controller 103 notifies the CPU 101 of completion of the transfer descriptor 2. Then, the USB host controller 103 executes transfer according to the transfer descriptor 3 following the transfer descriptor 2.

Specifically, according to the transfer descriptor 3, the USB host controller 103 transfers the data of the TD memory 1 to the USB device 130. At this time, the CPU 101 which has been notified of the completion of transfer controls the data transfer processing block 105 according to the control program to execute data transfer from the CPU memory 102 to the TD memory 2. Data of a block D which is to be transferred next in the transfer source data D2 in the CPU memory 102 is transferred to the TD memory 2. That is, USB transfer (i.e., data transfer from the TD memory 1 in the transfer memory 104 to the USB device 130) using the USB host controller 103 according to the transfer descriptor 3 and internal data transfer processing (i.e., data transfer from the CPU memory 102 to the TD memory 2 in the transfer memory 104) by the data transfer processing block 105 are performed in parallel.

Moreover, "storing data in the TD memory 2 in a block 4 via EP 2 in the USB device" is set as the subsequent transfer descriptor 4 (TD 4). Also, in this case, the USB host system is preferably configured so that each of the internal data transfer processing by the data transfer processing block 105 and setting of the subsequent transfer descriptor 4 is completed before the USB transfer according to the transfer descriptor 3 is completed.

When all the data of the TD memory 1 is transferred to the USB device 130, the USB host controller 103 notifies the CPU 101 of completion of the transfer descriptor 3. Then, the USB host controller 103 executes transfer according to the transfer descriptor 4 following the transfer descriptor 3.

Specifically, according to the transfer descriptor 4, the USB host controller 103 transfers data of the TD memory 2 to the USB device 130. At this time, the CPU 101 which has been notified of the completion of transfer controls the data transfer processing block 105 according to the control program to execute data transfer from the CPU memory 102 to the TD memory 1. Data of a block E which is to be transferred next in the transfer source data D2 in the CPU memory 102 is transferred to the TD memory 1. That is, USB transfer (i.e., data transfer from the TD memory 2 in the transfer memory 104 to the USB device 130) using the USB host controller 103 according to the transfer descriptor 4 and internal data transfer processing (i.e., data transfer from the CPU memory 102 to the TD memory 1 in the transfer memory 104) by the data transfer processing block 105 are performed in parallel.

Hereafter, the same operation is repeatedly executed until all the transfer source data D2 is transferred.

Figure 4A:
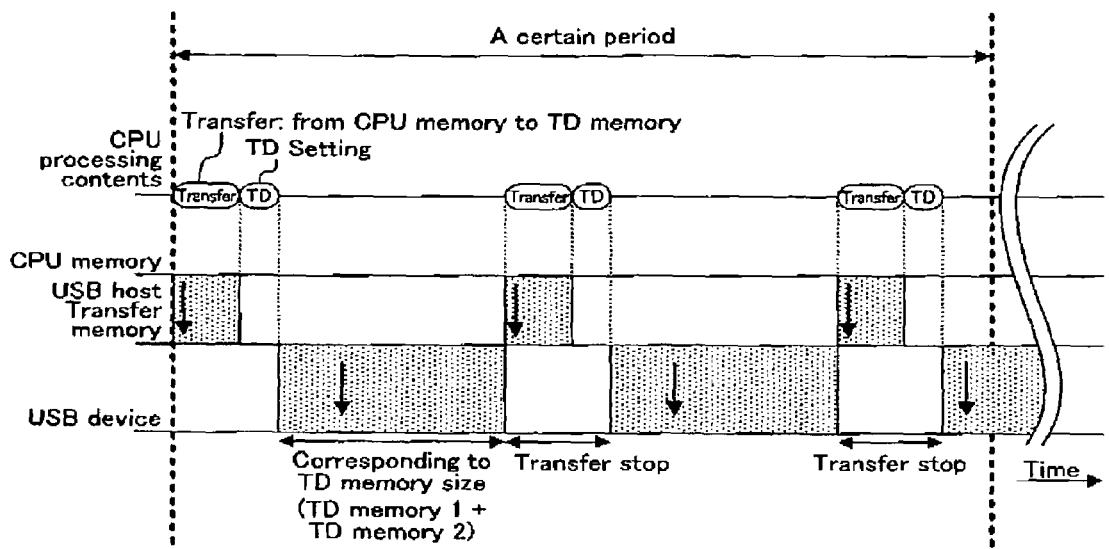
FIG. 4A is a view showing an exemplary data transfer operation in a known manner.
Figure 4B:
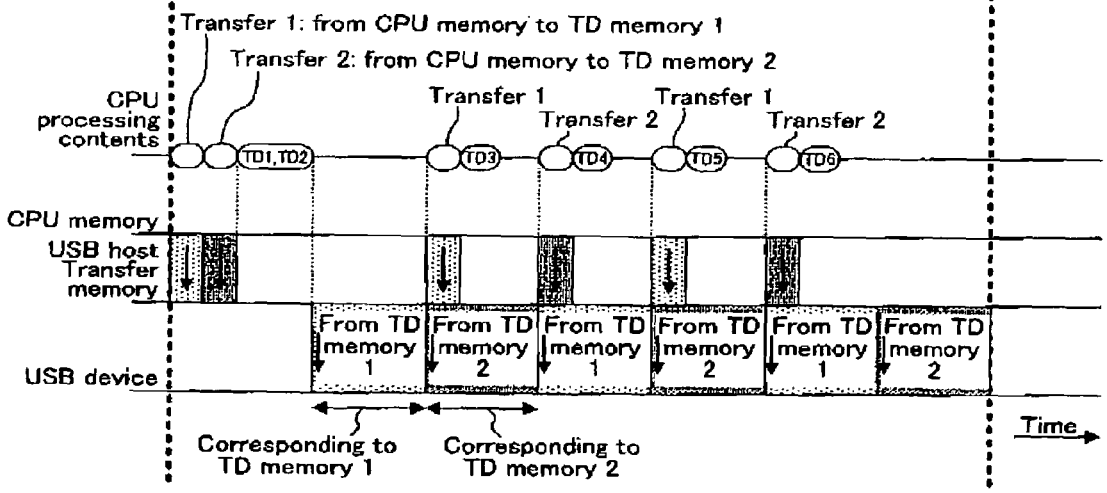
FIG. 4B is a view showing an exemplary data transfer operation of the USB host system of FIG. 3.

FIG. 4A is a view showing an operation when the known transfer method is used. FIG. 4B is a view showing an operation according to this embodiment. As shown in FIG. 4A, in the known transfer method, a period in which USB transfer from a transfer memory in a USB host controller to a USB device is stopped is generated. In contrast to this, as shown in FIG. 4B, in this embodiment, USB transfer is not stopped and data transfer is completed within a certain period which is shorter than that in the known transfer method.

That is, according to this embodiment, a plurality of transfer descriptors using different regions in a transfer memory are set, so that data transfer to a USB device according to a transfer descriptor and internal data transfer processing from a CPU memory to the transfer memory can be executed in parallel. Accordingly, USB transfer by a USB host controller can be continuously executed and thus transfer speed can be increased.

In each of the first and second embodiments, it is assumed that a plurality of transfer descriptors are continuously set. However, a plurality of transfer descriptors set for one end point of a USB device do not have to be continuous. For example, when a plurality of USB devices are connected to a USB host system, between a plurality of transfer descriptors for one of the USB devices, a transfer descriptor for another one of the USB device may be inserted.

Figure 5:
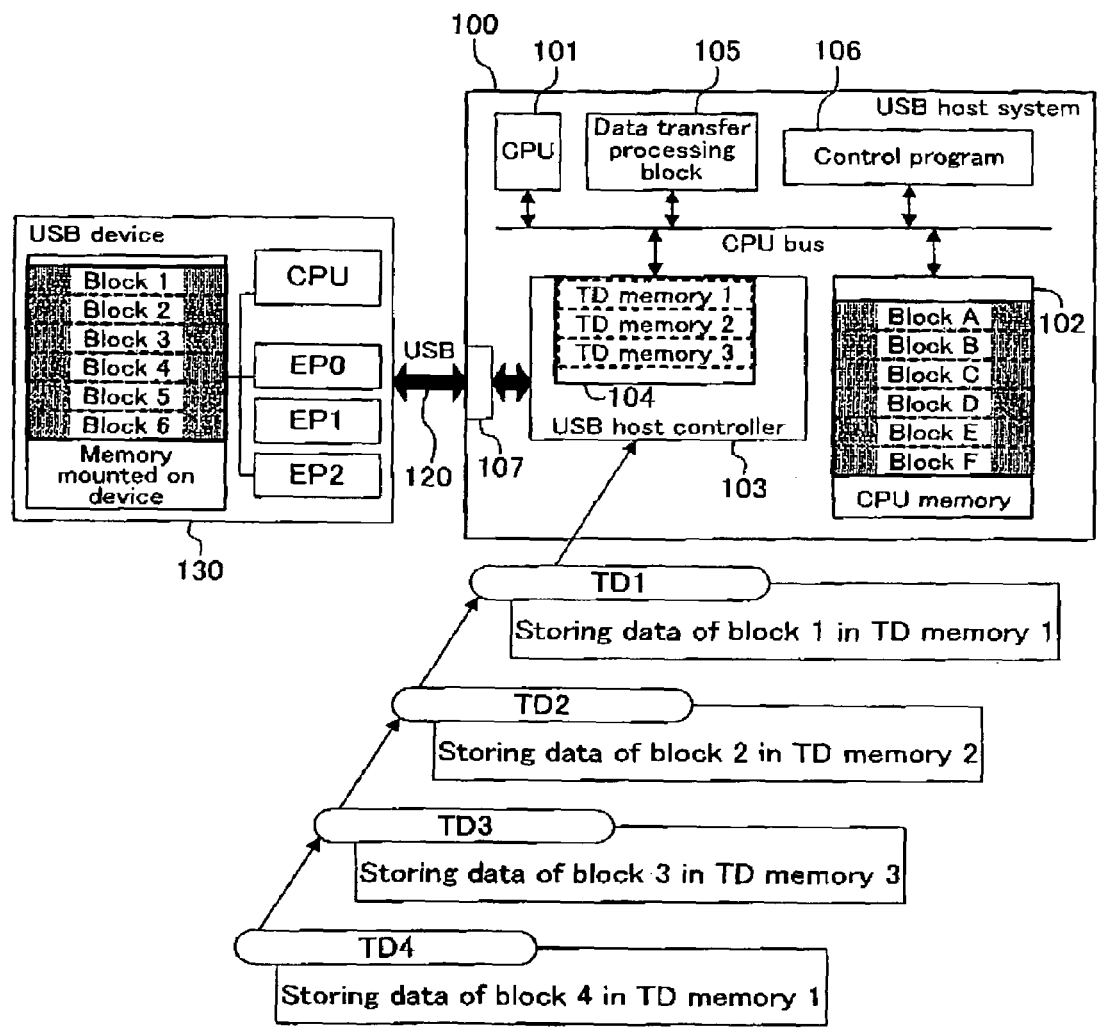
FIG. 5 is a block diagram illustrating a configuration of a USB host system according to a modified example of the first embodiment of the present invention.

Moreover, in each of the first and second embodiments, two transfer descriptor regions are allocated in a transfer memory. However, the number of transfer descriptor regions to be allocated in a transfer memory is not limited but three or more transfer descriptor regions may be allocated. FIG. 5 is a block diagram illustrating, as a modified example of the first embodiment, a configuration of a USB host system in which three transfer descriptor regions are allocated in a transfer memory. In FIG. 5, TD memories 1, 2 and 3 are allocated as first, second and third transfer descriptor regions in a transfer memory 104.

The operation of the USB host system having the configuration of FIG. 5 is as follows. First, a transfer descriptor 1 (TD 1) is set for the USB host controller 103. The transfer descriptor 1 uses the TD memory 1. Moreover, as a subsequent transfer descriptor to the transfer descriptor 1, a transfer descriptor 2 (TD 2) is set. Furthermore, as a subsequent transfer descriptor to the transfer descriptor 2, a transfer descriptor 3 (TD 3) is set. The transfer descriptor 2 uses the TD memory 2 and the transfer descriptor 3 uses the TD memory 3.

Then, the USB host controller 103 starts transfer. After completion of transfer according to the transfer descriptor 1, the data transfer processing block 105 transfers data stored in the TD memory 1 to the CPU memory 102. Thereafter, as a subsequent transfer descriptor, a transfer descriptor 4 is set for the USB host controller 103. The internal data transfer processing and the transfer descriptor setting can be executed at any time before transfers according to the transfer descriptors 2 and 3 are completed. By repeating the above-described operation, data can be transferred without being stopped.

Third Embodiment

Figure 6:
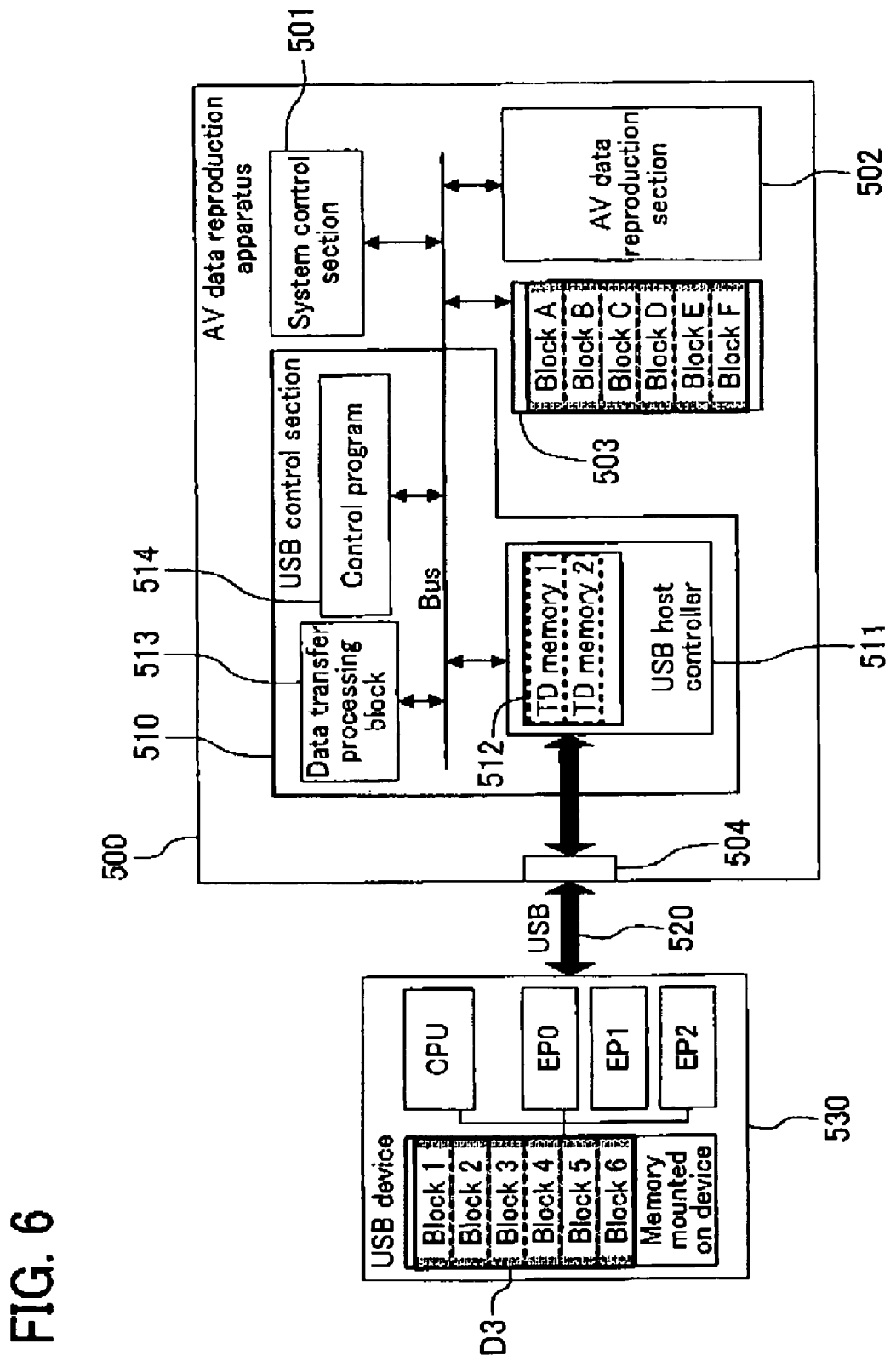
FIG. 6 is a block diagram illustrating a configuration of an AV data reproduction apparatus according to a third embodiment of the present invention.

FIG. 6 is a block diagram illustrating a configuration of an AV data reproduction apparatus according to a third embodiment of the present invention. In FIG. 6, an AV data reproduction apparatus 500 includes a USB host system incorporated therein. The AV data reproduction apparatus 500 reads out AV data from a USB device 530 connected to the AV data reproduction apparatus 500 via a USB bus 520 and reproduces AV data. The AV data reproduction apparatus 500 includes a system control section 501, an AV data reproduction section 502, an AV data storage section 503, a USB connection portion 504 for connecting the USB device 530 with the AV data reproduction apparatus 500, and a USB control section 510 for controlling USB data transfer with the USB device 530 connected to the USB connection portion 504. The AV data reproduction section 502 reproduces AV data maintained in the AV data storage section 503. The system control section 501 controls the AV data reproduction section 502, the AV data storage section 503 and the USB control section 510.

The USB control section 510 includes a USB host controller 511 which is compliant with the OHCI standard and includes a transfer memory 512 for USB data transfer, a data transfer processing block 513 for performing internal data transfer between the AV data storage section 503 and the transfer memory 512, and a storage section 514 for storing a control program for setting a transfer descriptor for the USB host controller 511.

In this embodiment, the AV data reproduction apparatus 500 reads out transfer source AV data D3 from the USB device 530 via the USB bus 520, stores the transfer source AV data D3 in the AV data storage section 503 and reproduces the transfer source AV data D3 by the AV data reproduction section 502. First, the USB control section 510 in the AV data reproduction apparatus 500 executes USB data transfer. While the USB data transfer is executed, data is transferred from the USB device 530 to the transfer memory 512 in the USB host controller 511. Thereafter, the data transfer processing block 513 performs data transfer from the transfer memory 512 to the AV data storage section 503. AV data stored in the AV data storage section 503 is read out by the AV data reproduction section 502 and then reproduction processing is executed.

In this embodiment, the operation of data transfer from the USB device 530 to the AV data storage section 503 is performed in the same manner as in the first embodiment. To transfer data from the USB device 530 to the transfer memory 512, a transfer descriptor has to be set for the USB host controller 511. Therefore, in this embodiment, the system control section 501 executes the control program stored in the storage section 514, thereby setting a transfer descriptor for the USB host controller 511. That is, transfer descriptor setting means is realized by the system control section 501 and the control program. When a transfer descriptor is set, contents of the transfer descriptor are written in the transfer memory 512.

In the transfer memory 512, a plurality of transfer descriptor regions are allocated. Assume that the transfer descriptor setting means is capable of setting, for one end point of a USB device, a plurality of transfer descriptors using the transfer descriptor regions, respectively. Thus, even while data is transferred from the transfer memory 512 to the AV data storage section 503, data transfer from the USB device 530 to the transfer memory 512 becomes possible.

In this embodiment, it is assumed that two transfer descriptor regions are allocated in the transfer memory 512. Specifically, in the transfer memory 512, a TD memory 1 as a first transfer descriptor region and a TD memory 2 as a second transfer descriptor region are allocated. The TD memory 1 and the TD memory 2 may have the same size or different sizes. Moreover, the transfer memory 512 does not have to be divided into completely two parts, i.e., the TD memory 1 and the TD memory 2 but may be divided into three or more regions, i.e., the TD memory 1, the TD memory 2 and another region so that two transfer descriptor regions and another region are allocated.

A data transfer method for transferring AV data from the USB device 530 to the transfer memory 512 and then, using the data transfer processing block 513, from the transfer memory 512 to the AV data storage section 503 is executed in the same manner as in the first embodiment. Specifically, after completion of USB data transfer according to a transfer descriptor, while USB data transfer is performed according to a subsequent transfer descriptor, internal data transfer processing from the transfer memory 512 to the AV data storage section 503 is executed in parallel.

In the same manner as in the first embodiment, AV data is continuously read out from the USB device 530 and stored in the AV data storage section 503. When an amount of the AV data which has been read out from the USB device 530 and stored in the AV data storage section 503 reaches a certain level, the AV data reproduction section 502 starts data read from the AV data storage section 503 and then executes reproduction processing. In this manner, data storage processing from the USB device 530 to the AV data storage section 503 by the USB control section 510 and reproduction processing of data stored in the AV data storage section 503 by the AV data reproduction section 502 are executed in parallel, so that AV reproduction processing can be executed while data read from the USB device 530 is continuously performed.

Figure 7:
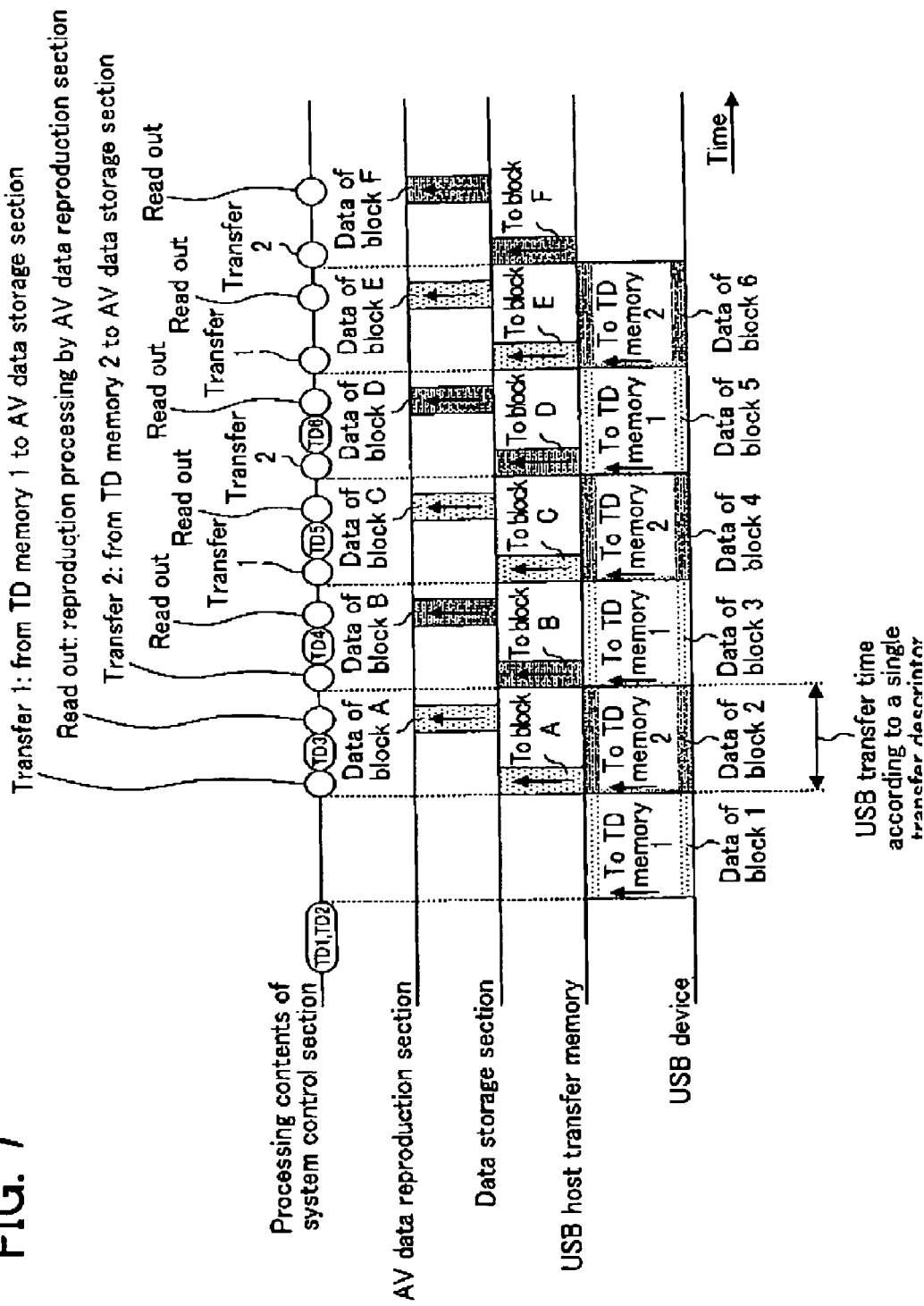
FIG. 7 is a diagram showing an exemplary operation of the AV data reproduction apparatus of FIG. 6.

FIG. 7 is a diagram showing an exemplary operation according to this embodiment. In the operation of FIG. 7, while USB data transfer is performed according to a single transfer descriptor, internal data transfer processing from the transfer memory 512 to the AV data storage section 503 and reproduction processing for executing read out of AV data from the AV data storage section 503 and reproduction of the AV data are performed. Thus, the transfer source AV data D3 stored in the USB device 530 can be reproduced in the AV data reproduction apparatus 500 without being stopped while the transfer source AV data D3 stored in the USB device 530 is read out from the USB device 530. To achieve this operation, it is preferable that the data transfer processing block 513 is realized by a block such as a DMA controller, which is capable of high-speed transfer.

In this embodiment, it is assumed that two transfer descriptor regions are allocated in a transfer memory. However, the number of transfer descriptor regions allocated in a transfer memory is not limited to two, but three or more transfer descriptor regions may be allocated. In this case, after completion of data transfer according to a transfer descriptor, while data transfer is performed according to the rest of transfer descriptors, internal data transfer processing from a transfer memory to an AV data storage section is executed in parallel.

Fourth Embodiment

Figure 8:
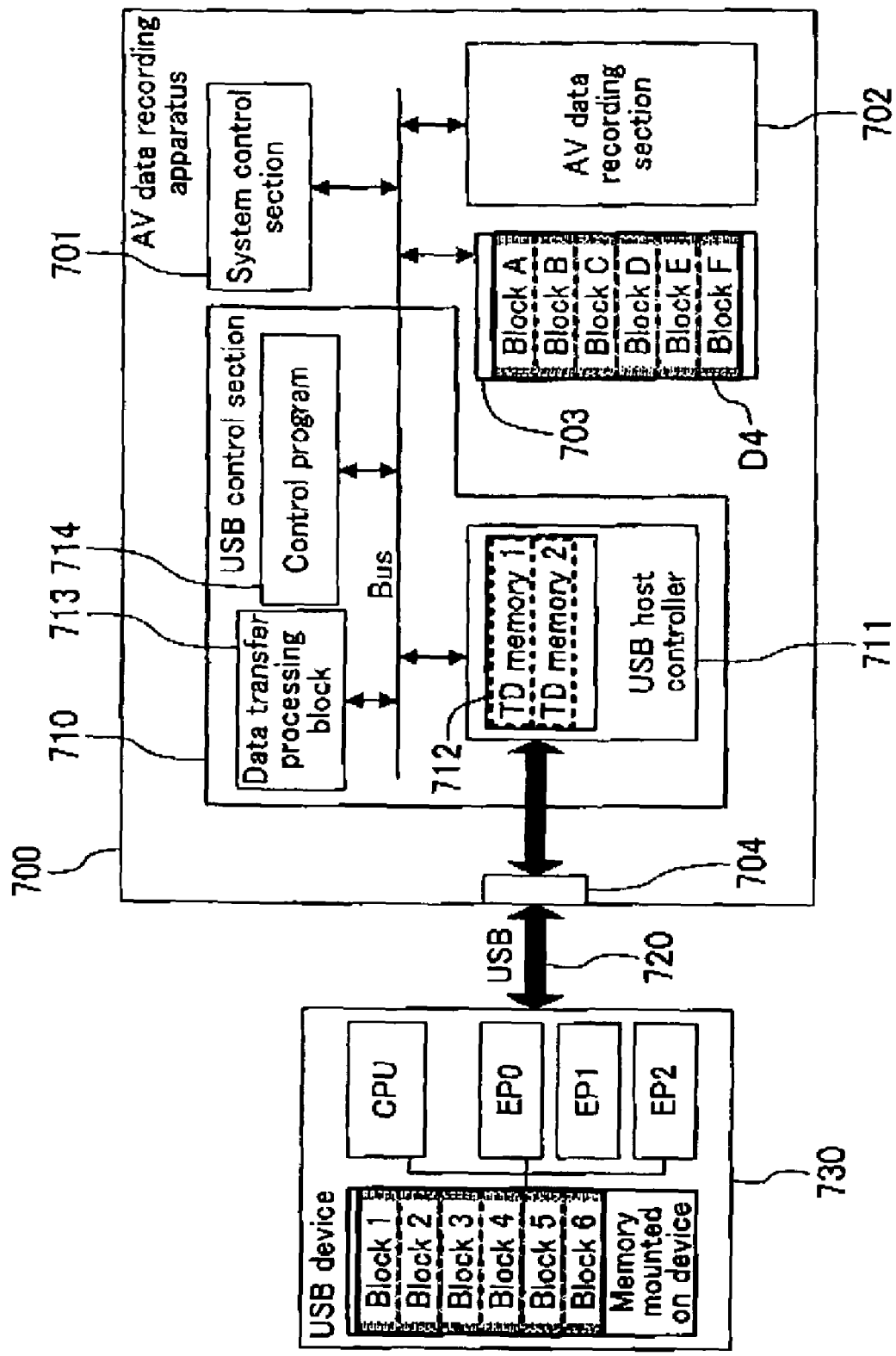
FIG. 8 is a block diagram illustrating a configuration of an AV data recording apparatus according to a fourth embodiment of the present invention.

FIG. 8 is a block diagram illustrating a configuration of an AV data recording apparatus according to a fourth embodiment of the present invention. In FIG. 8, an AV data recording apparatus 700 includes a USB host system incorporated therein. The AV data recording apparatus 700 records AV data in a USB device 730 connected to the AV data recording apparatus 700 via a USB bus 720. The AV data recording apparatus 700 includes a system control section 701, an AV data recording section 702, an AV data storage section 703, a USB connection portion 704 for connecting the USB device 730 with the AV data recording apparatus 700, and a USB control section 710 for controlling USB data transfer with the USB device connected to the USB connection portion 704. The AV data storage section 702 records AV data in the AV data storage section 703. The system control section 701 controls the AV data storage section 702, the AV data storage section 703 and the USB control section 710.

The USB control section 710 includes a USB host controller 711 which is compliant with the OHCI standard and includes a transfer memory 712 for USB data transfer, a data transfer processing block 713 for performing internal data transfer between the AV data storage section 703 and the transfer memory 712, and a storage section 714 for storing a control program for setting a transfer descriptor for the USB host controller 711.

In this embodiment, the AV date recording apparatus 700 records a transfer source AV data D4 recorded in the AV data storage section 703 by the AV data recording section 702 in the USB device 730 via the USB bus 720. First, the AV data recording section 702 in the AV data recording apparatus 700 executes recording processing of storing AV data in the AV data storage section 703. Thereafter, the data transfer processing block 713 transfers AV data from the AV data storage section 703 to the transfer memory 712 in the USB host controller 711. Then, the USB control section 710 executes USB data transfer. At that time, AV data is transferred from the transfer memory 712 to the USB device 730.

The operation of data transfer from the AV data storage section 703 to the USB device 730 according to this embodiment is performed in the same manner as in the second embodiment. To transfer data from the transfer memory 712 to the USB device 730, a transfer descriptor has to be set for the USB host controller 711. Thus, in this embodiment, the system control section 701 executes a control program stored in the storage section 714, thereby setting a transfer descriptor for the USB host controller 711. That is, transfer descriptor setting means is realized by the system control section 701 and the control program. When a transfer descriptor is set, contents of the transfer descriptor are written in the transfer memory 712.

In the transfer memory 712, a plurality of transfer descriptor regions are allocated. Assume that the transfer descriptor setting means is capable of setting, for one end point of a USB device, a plurality of transfer descriptors using the transfer descriptor regions, respectively. Thus, even while data is transferred from the AV data storage section 703 to the transfer memory 712, data transfer from the transfer memory 712 to the USB device 730 becomes possible.

In this embodiment, it is assumed that two transfer descriptor regions are allocated in the transfer memory 712. Specifically, in the transfer memory 712, a TD memory 1 as a first transfer descriptor region and a TD memory 2 as a second transfer descriptor region are allocated. The TD memory 1 and the TD memory 2 may have the same size or different sizes. Moreover, the transfer memory 712 does not have to be divided into completely two parts, i.e., the TD memory 1 and the TD memory 2 but may be divided into three or more regions, i.e., the TD memory 1, the TD memory 2 and another region so that two transfer descriptor regions and another region are allocated.

A data transfer method for transferring AV data from the AV data storage section 703 to the transfer memory 712 using the data transfer processing block 713 and then from the transfer memory 712 to the USB device 730 is executed in the same manner as in the second embodiment. Specifically, after completion of USB data transfer according to a transfer descriptor, while USB data transfer is performed according to a subsequent transfer descriptor, internal data transfer processing from the AV data storage section 703 to the transfer memory 712 is executed in parallel.

When an amount of AV data which has been stored in the AV data storage section 703 reaches a certain level, data transfer to the USB device 730 is started. In the same manner as in the second embodiment, AV data stored in the AV data storage section 703 is continuously transferred to the USB device 730. In this manner, data recording processing to the AV data storage section 703 by the AV data recording section 702 and data transfer processing from the AV data storage section 703 to the USB device 730 by the USB control section 710 are executed in parallel, so that data writing to the USB device 730 can be executed while AV data recording processing is continuously performed.

Figure 9:
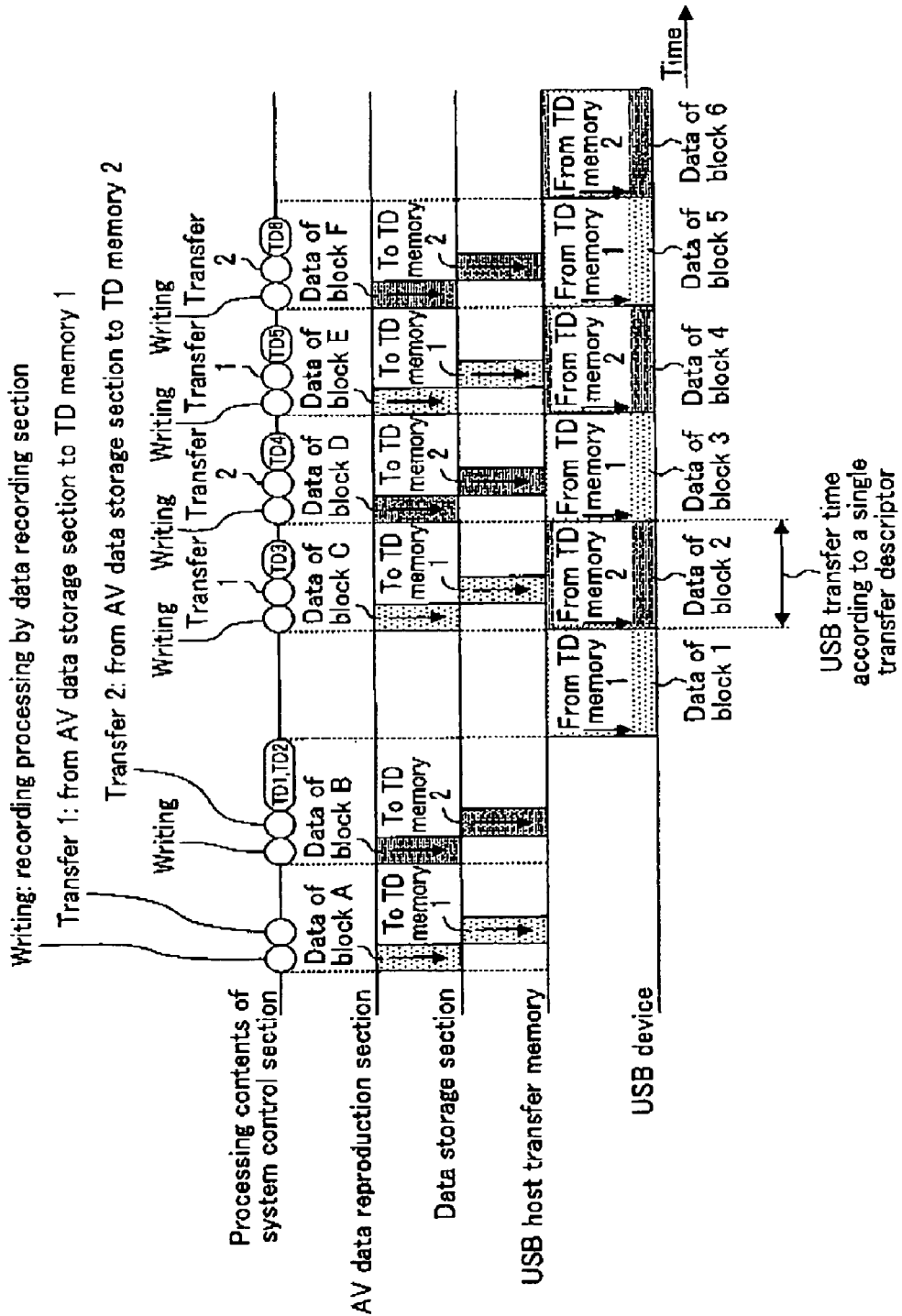
FIG. 9 is a diagram showing an exemplary operation of the AV data recording apparatus of FIG. 8.

FIG. 9 is a diagram showing an exemplary operation according to this embodiment. In the operation of FIG. 9, while USB data transfer is performed according to a single transfer descriptor, the data recording processing of recording AV data in the AV data storage section 703 and internal data transfer processing from the AV data storage section 703 to the transfer memory 712 are performed. Thus, the AV data recorded by the AV data recording section 702 can be stored in USB device 730 without being stopped. To achieve this operation, it is preferable that the data transfer processing block 713 is realized by a block such as a DMA controller, which is capable of high-speed transfer.

In this embodiment, it is assumed that two transfer descriptor regions are allocated in a transfer memory. However, the number of transfer descriptor regions allocated in a transfer memory is not limited to two, but three or more transfer descriptor regions may be allocated. In this case, after completion of data transfer according to a transfer descriptor, while data transfer is performed according to the rest of transfer descriptors, internal data transfer processing from an AV data storage section to a transfer memory is executed in parallel.

In each of the above-described embodiments, the transfer descriptor setting means is realized by a CPU or a system control section and a control program. However, the transfer descriptor setting means is not limited thereto but may be realized by, for example, hardware.

The present invention allows the high-speed transfer function of transferring USB data effectively by using a transfer memory. Therefore, the present invention is useful, for example, for audio equipment, a digital TV, a digital video recorder or the like, which reads/writes AV data to/from a USB device. Moreover, the present invention can process AV data and thus is applicable to some other AV system including a USB host.

What is claimed is:

1. A USB host system for performing USB data transfer with a USB device connected thereto, the system comprising:
   a USB host controller which is compliant with an OHCI standard and includes a transfer memory for USB data transfer;
   a memory;
   a data transfer processing block for performing internal data transfer between the memory and the transfer memory; and
   transfer descriptor setting means for setting, for the USB host controller, a transfer descriptor for executing USB data transfer,
   wherein in the transfer memory, first through Nth (N is an integer of 2 or larger) transfer descriptor regions are allocated, and
   wherein the transfer descriptor setting means is configured so as to be able to set, for one end point of the USB device, a plurality of transfer descriptors using the first through Nth transfer descriptor regions, respectively, for the USB host controller,
   wherein when data is read from the USB device,
   the USB host controller transfers data read out from the USB device to one of the first through Nth transfer descriptor regions according to a mth (m is an integer of 1 or more) transfer descriptor, and continuously transfers data read out from the USB device to another of the first through Nth transfer descriptor regions according to a (m+1)th transfer descriptor, and
   after notified of completion of the data transfer according to the mth transfer descriptor from the USB host controller, the transfer descriptor setting means controls the data transfer processing block to execute internal data transfer processing of transferring data stored in the one of the first through Nth transfer descriptor regions to the memory in parallel to the data transfer by the USB host controller according to the (m+1)th transfer descriptor.

2. The system of claim 1, wherein the plurality of transfer descriptors are continuously set.

3. The system of claim 1, wherein the system is configured so that in a period of the data transfer according to the (m+1)th transfer descriptor, the internal data transfer processing and the processing of setting another transfer descriptor after the (m+1)th transfer descriptor are completed.

4. The system of claim 1, wherein the data transfer processing block is formed of a DMA controller.

5. An AV data reproduction apparatus for reading out AV data from a USB device connected thereto and reproducing AV data, the apparatus comprising:
   a USB host controller which is compliant with an OHCI standard and includes a transfer memory for USB data transfer;
   an AV data storage section;
   an AV data reproduction section for reproducing AV data maintained in the AV storage section;
   a data transfer processing block for performing internal data transfer between the AV data storage section and the transfer memory; and
   transfer descriptor setting means for setting, for the USB host controller, a transfer descriptor for executing USB data transfer,
   wherein in the transfer memory, first through Nth (N is an integer of 2 or larger) transfer descriptor regions are allocated,
   wherein the transfer descriptor setting means is configured so as to be able to set, for one end point of the USB device, a plurality of transfer descriptors using the first through Nth transfer descriptor regions, respectively, for the USB host controller, and
   wherein when AV data is read out from the USB device,
   the USB host controller transfers AV data read out from the USB device to one of the first through Nth transfer descriptor regions according to a mth (m is an integer of 1 or more) transfer descriptor, and continuously transfers AV data read out from the USB device to another of the first through Nth transfer descriptor regions according to a (m+1)th transfer descriptor, and
   after notified of completion of the AV data transfer according to the mth transfer descriptor from the USB host controller, the transfer descriptor setting means controls the data transfer processing block to execute internal data transfer processing of transferring AV data stored in the one of the first through Nth transfer descriptor regions to the AV data storage section in parallel to the AV data transfer by the USB host controller according to the (m+1)th transfer descriptor.

6. The apparatus of claim 5, wherein the plurality of transfer descriptors are continuously set.

7. An AV data recording apparatus for recording AV data in a USB device connected thereto, the apparatus comprising:
   a USB host controller which is compliant with an OHCI standard and includes a transfer memory for USB data transfer;
   an AV data storage section;
   an AV data recording section for recording AV data in the AV data storage section;
   a data transfer processing block for performing internal data transfer between the AV data storage section and the transfer memory; and
   transfer descriptor setting means for setting, for the USB host controller, a transfer descriptor for executing USB data transfer,
   wherein in the transfer memory, first through Nth (N is an integer of 2 or larger) transfer descriptor regions are allocated,
   wherein the transfer descriptor setting means is configured so as to be able to set, for one USB end point of the USB device, a plurality of transfer descriptors using the first through Nth transfer descriptor regions, respectively, for the USB host controller, and
   wherein when AV data is written in the USB device,
   the USB host controller transfers AV data in one of the first through Nth transfer descriptor regions to the USB device according to a mth (m is an integer of 1 or more) transfer descriptor, and continuously transfers AV data in another of the first through Nth transfer descriptor regions to the USB device according to a (m+1)th transfer descriptor, and
   after notified of completion of the AV data transfer according to the mth transfer descriptor from the USB host controller, the transfer descriptor setting means controls the data transfer processing block to execute internal data transfer processing of transferring AV data stored in the AV data storage section to the transfer memory in parallel to the AV data transfer by the USB host controller according to the (m+1)th transfer descriptor.

8. The apparatus of claim 7, wherein the plurality of transfer descriptors are continuously set.

9. A USB host system for performing USB data transfer with a USB device connected thereto, the system comprising:
- a USB host controller which is compliant with an OHCI standard and includes a transfer memory for USB data transfer;
- a memory;
- a data transfer processing block for performing internal data transfer between the memory and the transfer memory; and
- transfer descriptor setting means for setting, for the USB host controller, a transfer descriptor for executing USB data transfer,
- wherein in the transfer memory, first through Nth (N is an integer of 2 or larger) transfer descriptor regions are allocated, and
- wherein the transfer descriptor setting means is configured so as to be able to set, for one end point of the USB device, a plurality of transfer descriptors using the first through Nth transfer descriptor regions, respectively, for the USB host controller,
- wherein when data is written in the USB device,
- the USB host controller transfers data in one of the first through Nth transfer descriptor regions to the USB device according to a mth (m is an integer of 1 or more) transfer descriptor, and continuously transfers data in another of the first through Nth transfer descriptor regions to the USB device according to a (m+1)th transfer descriptor, and
- after notified of completion of the data transfer according to the mth transfer descriptor from the USB best controller, the transfer descriptor setting means controls the data transfer processing block to execute internal data transfer processing of transferring data stored in the memory to the transfer memory in parallel to the data transfer by the USB host controller according to the (m+1)th transfer descriptor.

10. The system of claim 9, wherein the plurality of transfer descriptors are continuously set.

11. The system of claim 9, wherein the system is configured so that in a period of the data transfer according to the (m+1)th transfer descriptor, the internal data transfer processing and processing of setting another transfer descriptor after the (m+1)th transfer descriptor are completed.

12. The system of claim 9, wherein the data transfer processing block is formed of a DMA controller.

* * * * *